(12) United States Patent
Ansorge et al.

(10) Patent No.: US 8,007,183 B2
(45) Date of Patent: Aug. 30, 2011

(54) DOUBLE-ROW ANGULAR CONTACT ANTI-FRICTION BEARING COMPRISING A SPLIT OUTER BEARING RING AND A ONE-PIECE INNER BEARING RING

(75) Inventors: Ralf Ansorge, Dingolshausen (DE); Rudolf Zeidlhack, Essleben (DE)

(73) Assignee: Schaeffler KG, Herzogenaurach (DE)

( * ) Notice: Subject to any disclaimer, the term of this patent is extended or adjusted under 35 U.S.C. 154(b) by 475 days.

(21) Appl. No.: 12/280,425

(22) PCT Filed: Feb. 14, 2007

(86) PCT No.: PCT/DE2007/000270
§ 371 (c)(1),
(2), (4) Date: Aug. 22, 2008

(87) PCT Pub. No.: WO2007/095899
PCT Pub. Date: Aug. 30, 2007

(65) Prior Publication Data
US 2009/0016659 A1    Jan. 15, 2009

(30) Foreign Application Priority Data
Feb. 24, 2006  (DE) .......................... 10 2006 008 731

(51) Int. Cl.
*F16C 33/60* (2006.01)
(52) U.S. Cl. ......... 384/551; 384/499; 384/570; 384/584
(58) Field of Classification Search .......... 384/499–506, 384/512, 537, 551, 559, 561, 569, 570, 571, 384/584
See application file for complete search history.

(56) References Cited

U.S. PATENT DOCUMENTS

| 954,529 | A | 4/1910 | Lockwood |
| 1,003,055 | A | 9/1911 | Lockwood |
| 1,885,852 | A | 11/1932 | Medved |
| 3,958,847 | A * | 5/1976 | Cain et al. ..................... 384/504 |
| 4,798,482 | A * | 1/1989 | Kruk ............................. 384/571 |
| 5,492,419 | A * | 2/1996 | Miller et al. ................. 384/551 |
| 6,866,423 | B2 * | 3/2005 | Faltus et al. ................. 384/559 |
| 2003/0094849 | A1 | 5/2003 | Joki |

FOREIGN PATENT DOCUMENTS

| CN | 2075279 U | 4/1991 |
| DE | 331 985 A | 1/1921 |
| DE | 5 80 773 C | 7/1933 |
| DE | 592 247 C | 2/1934 |
| DE | 26 12 272 A1 | 9/1977 |
| DE | 36 21 381 A1 | 1/1988 |

(Continued)

*Primary Examiner* — Thomas R Hannon
(74) *Attorney, Agent, or Firm* — Lucas & Mercanti, LLP

(57) ABSTRACT

The invention relates to a double-row angular contact anti-friction bearing having a split outer bearing ring, a one-piece inner bearing ring, and anti-friction bodies located in two rows between the two rings. The outer bearing ring is split axially into two individual rings. To permit simple, reliable and secure transport of the bearing, the individual outer bearing rings are interconnected by a connecting element in a positive fit that allows play and the outer surfaces of the individual rings have at least one recess, which is spanned by the connecting element. At least the recess of an individual ring has a groove, in which a hook element on the connecting element engages in a positive fit and the individual rings can be twisted in relation to one another.

14 Claims, 3 Drawing Sheets

FOREIGN PATENT DOCUMENTS

| | | |
|---|---|---|
| DE | 202 00240 A | 5/2002 |
| DE | 10 2004 018 188 A1 | 11/2005 |
| EP | 15 19 058 A2 | 3/2005 |
| FR | 6 35 923 A | 3/1928 |
| FR | 14 49 050 A | 8/1966 |
| GB | 3 91 960 A | 5/1933 |
| GB | 961 563 A | 6/1964 |
| JP | 8 184 313 A | 7/1996 |
| JP | 8 232 963 A | 9/1996 |
| JP | 2002 310175 A | 10/2002 |
| JP | 2005140157 X | 6/2005 |

\* cited by examiner

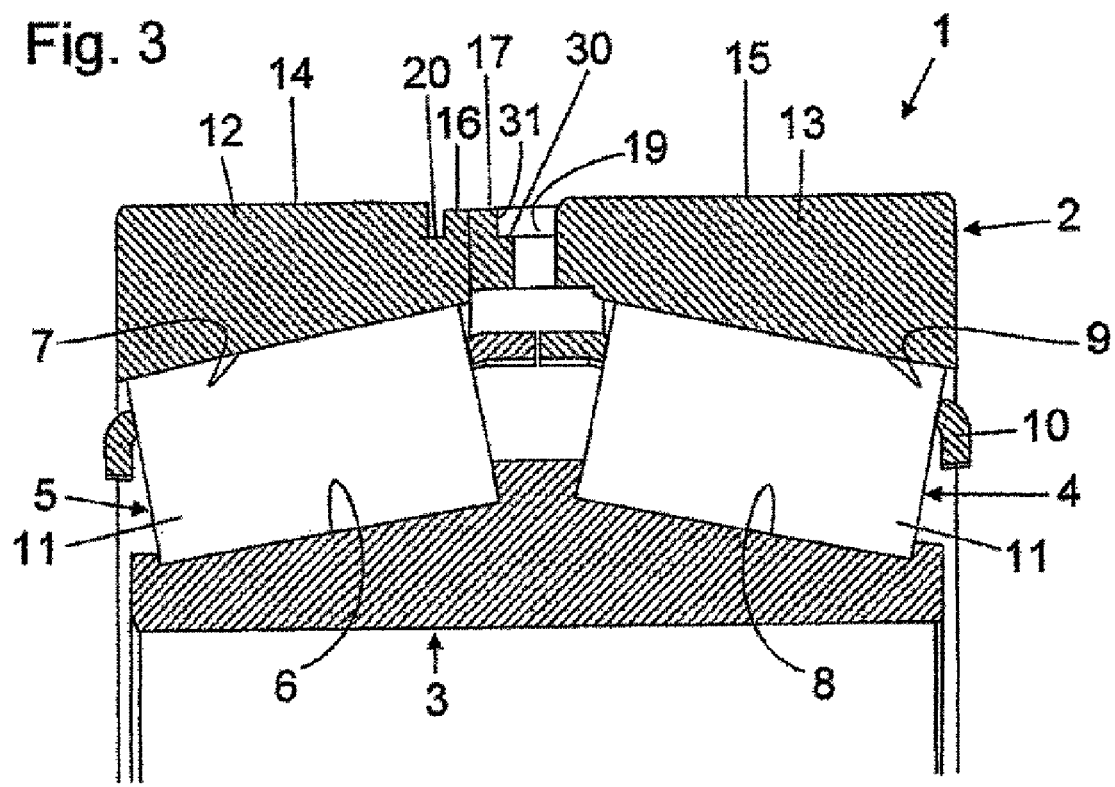
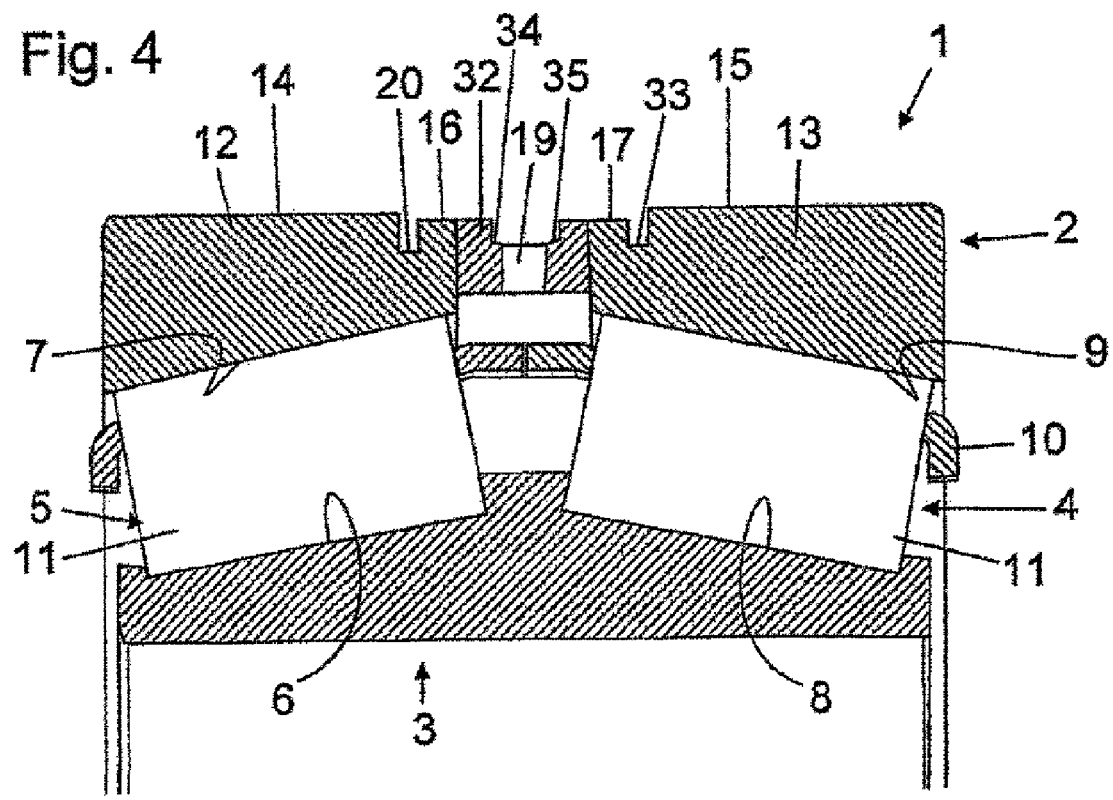

DOUBLE-ROW ANGULAR CONTACT ANTI-FRICTION BEARING COMPRISING A SPLIT OUTER BEARING RING AND A ONE-PIECE INNER BEARING RING

FIELD OF THE INVENTION

The invention relates to a double-row angular contact anti-friction bearing comprising a split outer bearing ring and a one-piece inner bearing ring and composed of a number of roller bodies which roll between the bearing rings in two rows one next to the other on their raceways and which are held at uniform distances with respect to one another by means of a bearing cage, wherein the outer bearing ring is of axially split design and is composed of two individual rings which are connected to one another by means of a connecting element.

BACKGROUND OF THE INVENTION

When such angular contact anti-friction bearings are manufactured, it is often necessary, after the individual components have been assembled, to connect the separate outer bearing rings to one another, or at least to secure them, in order to prevent the bearing from falling apart during the transportation, handling and mounting of the angular contact anti-friction bearings. Otherwise this could result in faults in the mounting, in particular the soiling of bearing components which have dropped out and damage to the bearing seals.

In angular contact anti-friction bearings with a one-piece outer bearing ring and split inner bearing ring it is already known to use special clamp rings to secure the inner bearing rings, which clamp rings are provided, for example, with resiliently flexible projections radially on the outside, which projections can be latched into cutouts or undercuts which are arranged radially on the inside of the two inner bearing rings and have a corresponding shape. In this way, the two inner bearing rings are secured and prestressed with respect to one another in the axial direction.

However, such clamp rings still present problems in practical use and also require special cutouts or undercuts on the insides of the inner bearing rings in order to be able to come to bear there with a form fit by engaging their radial projections. When such clamp rings are used there is also always the risk that the rings will be damaged, bent or even forced out of their anchoring in the undercuts of the inner bearing rings when the angular contact anti-friction bearings are installed or transported, which can occur through just slight initial tilting of the angular contact anti-friction bearings with respect to location of installation. There is therefore the risk that the securing effect of such spring rings or clamp rings can be lost, which leads to damage to the angular contact anti-friction bearings.

DE 592 247 C discloses a double-row angular contact anti-friction bearing comprising a split outer bearing ring and a one-piece inner bearing ring, the outer bearing ring of which is composed of two individual rings between which a spacer ring which is composed of two half ring elements is arranged. Half ring elements are connected to the outer rings by means of an annular flange, wherein the annular flange engages in a corresponding recess in an inner edge of just one outer ring, which is intended to prevent radial movements of the spacer ring. DE 592 247 C does not describe connecting the individual rings by means of the spacer ring.

DE 36 21 381 A1 discloses a double-row angular contact anti-friction bearing in which both the outer rings and the inner rings are split and are each composed of individual rings. In an embodiment according to FIG. 2 in said document, the two individual rings of the outer ring are connected to one another with a force fit by means of a clamp, while a spacer ring is arranged between the individual rings of the inner ring.

DE 10 2004 018 188 A1 describes a double-row angular contact anti-friction bearing in an X or O arrangement with a split inner bearing ring and a one-piece outer bearing ring, wherein the inner bearing ring is of axially split design and is composed of two individual rings which are connected to one another with a positive fit by means of a connecting element. This connecting element which serves at the same time as a spacer ring is used to produce permanent axial prestress and is connected in a non-detachable fashion to the inner bearing rings using, for example, a bonded connection.

DE 202 00 240 U1 also discloses a double-row angular contact anti-friction bearing comprising a split inner bearing ring and a one-piece outer bearing ring, whose two individual rings of the inner bearing ring are connected to one another by means of a connecting element in such a way that the connecting element is connected to one individual ring with an interference fit and to the other individual ring with a clearance fit.

While the connection of split inner bearing rings is relatively unproblematic, the connection of outer bearing rings has hitherto presented problems. This is due, inter alia, to the fact that a person skilled in the art has preferred solutions for the connection of split outer bearing rings, which solutions are aimed at achieving the tightest possible frictionally locking connection since this permits simultaneous prestressing of the angular contact anti-friction bearing, with the result that the angular contact anti-friction bearing can be mounted with the prestress already preset.

OBJECT OF THE INVENTION

The invention is based on the object of providing a double-row angular contact anti-friction bearing which comprises a split outer bearing ring and a one-piece inner bearing ring, which avoids the disadvantages of the prior art and whose individual rings which form the outer bearing ring are connected to one another in such a way that when the angular contact anti-friction bearing is transported and mounted they can be securely held together and the outer ring components can be rotated in relation to one another.

SUMMARY OF THE INVENTION

The invention is based on the realization that the problem which has been defined can be solved in a surprisingly easy way in that the individual rings of the outer bearing ring are connected to one another with a positive fit by means of the connecting element, in which case the connecting element, astride shoulders, is supported in the lateral surfaces of the individual rings.

The invention is therefore based on a double-row angular contact anti-friction bearing, comprising a split outer bearing ring and a one-piece inner bearing ring, and composed of a number of roller bodies which roll between the bearing rings in two rows one next to the other on their raceways and are held at uniform distances from one another by means of a bearing cage, wherein the outer bearing ring is of axially split design and is composed of two individual rings which are connected to one another by means of a connecting element. In addition there is provision that the individual rings of the outer bearing ring are connected to one another with a positive fit and with play by means of the connecting element, wherein lateral surfaces of the individual rings each have at least one shoulder astride which the connecting element is supported, wherein at least the shoulder of one individual ring has a groove in which a hook element of the connecting element engages with a positive fit, and wherein the individual rings can be rotated in relation to one another.

This design advantageously ensures that the individual rings of the outer bearing ring are connected to one another in a comparatively loose but nevertheless secure fashion. This configuration permits surprising effects. The inventor has intentionally avoided previously known solutions which aimed at prestressing the angular contact anti-friction bearing, in particular by means of the connecting element. Now, the individual rings of the outer bearing ring which are sufficiently securely connected to one another have a certain degree of axial and/or radial play which is quite intentionally allowed for. This is because since the individual rings can be rotated in relation to one another, setting phenomena of the roller bodies during transportation, during which the angular contact anti-friction bearing can become tilted, can be avoided. The rotational freedom of the individual rings of the outer bearing ring brings about a certain degree of self-alignment of the roller bodies. In addition, it is ensured that tension can be applied axially through the angular contact anti-friction bearing when it is installed since the connecting element which is connected with a positive fit to the individual rings of the outer bearing ring also permits this.

Furthermore, it is possible to provide that the connecting element is connected with a force fit to one individual ring and with a positive fit to the respective other individual ring.

In other practical developments it is possible to provide that the width of at least one groove is greater than the diameter of the hook element.

Other practical refinements of the invention are characterized by the fact that the radial upper side of the connecting element is arranged radially lower than the outer lateral surfaces of the individual rings. Alternatively, it is possible to provide that the radial upper side of the connecting element is aligned with the lateral surfaces of the individual rings.

In addition, according to further refinements, it is possible to provide that the connecting element is embodied as a one-piece ring or as a split ring. As an alternative to this it is also possible for the connecting element to be composed of a plurality of interlocks which are each connected with a positive fit to the individual rings, or for the connecting element to be embodied as clamping strip with a U profile.

One particularly preferred refinement of the invention provides that the connecting element is provided at its edges with a plurality of threaded bores into which the threaded bolts are screwed, wherein the threaded bolts are connected at least to an individual ring with a positive fit.

In one advantageous development of this refinement it is possible to provide that the hook element is embodied as a radially inwardly projecting rim or as a threaded bolt.

In one particularly practical variant of the invention there is provision that the connecting element is embodied as a spacer element in such a way that an axial distance is produced between the individual rings by means of the connecting element which is connected to the individual rings with a positive fit.

Another advantageous addition to the invention is distinguished by the fact that the two individual rings of the outer bearing ring are of symmetrical design with the result that the shoulder of one individual ring has milled into it a groove which corresponds to the groove in the other individual ring.

In one particularly preferred refinement of the invention there is provision that the groove in one individual ring is axially wider than the groove in the other individual ring of the outer bearing ring.

In a further refinement of the invention there is provision that a spacer ring is arranged between the individual rings of the outer bearing ring.

Finally, one refinement of the invention, which is distinguished by the fact that the angular contact anti-friction bearing is embodied as a tapered roller bearing and is used as a fixed bearing for a main bearing of a rotor of a wind power installation, is particularly advantageous.

BRIEF DESCRIPTION OF THE DRAWINGS

A number of embodiments of the invention will be explained in detail below with reference to the appended drawings, in which:

FIG. 3 shows a third exemplary embodiment of an angular contact anti-friction bearing according to the invention in cross section, FIG. 4 shows a fourth exemplary embodiment of an angular contact anti-friction bearing according to the invention in cross section.

DETAILED DESCRIPTION OF THE DRAWINGS

Figure 1:
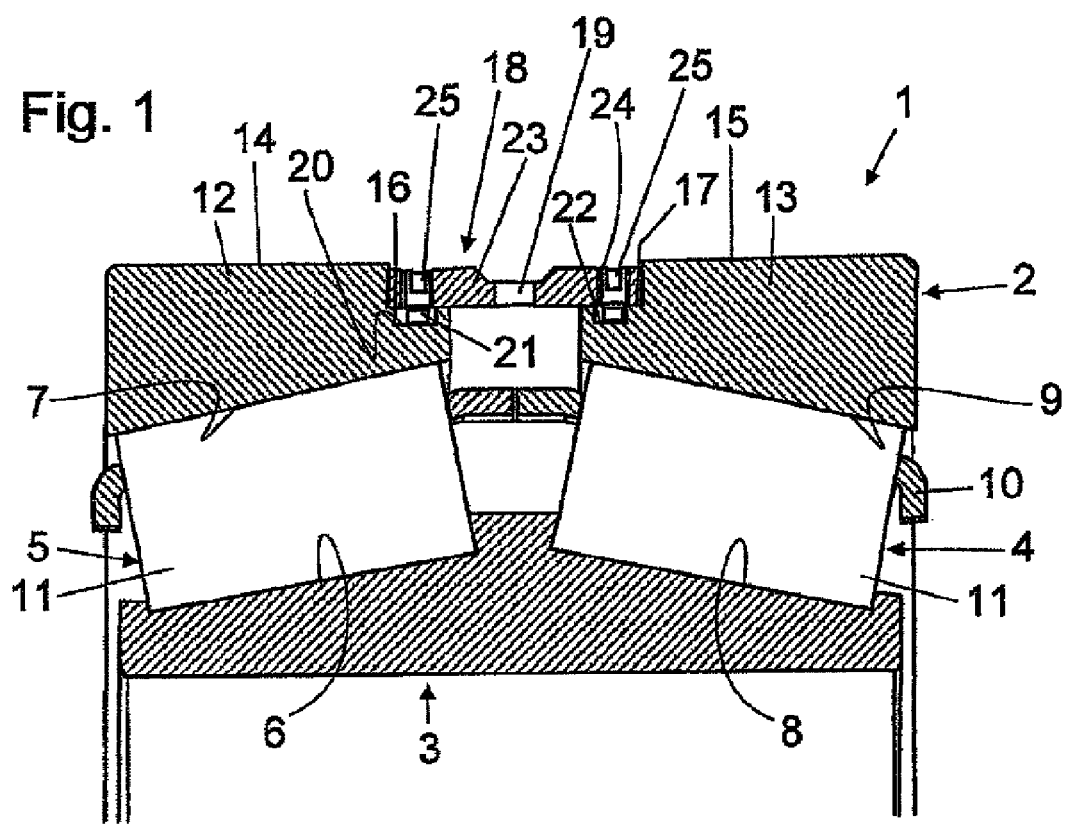
FIG. 1 shows a first exemplary embodiment of an angular contact anti-friction bearing according to the invention in cross section.

FIGS. 1 to 5 each illustrate a double-row angular contact anti-friction bearing which is embodied as a tapered roller bearing 1 in an X arrangement and is provided, for example, as a fixed bearing for a main bearing of a rotor of a wind power installation.

The tapered roller bearing 1 is composed essentially of an outer bearing ring 2 and an inner bearing ring 3 as well as of a number of roller bodies 11 which roll between the bearing rings 2 and 3 in two rows 4, 5 one next to the other on their raceways 6, 7, 8, 9 and which are held at uniform distances with respect to one another by means of a bearing cage 10. The inner bearing ring 3 of the tapered roller bearing 1 is embodied in one piece here, while the outer bearing ring 2 is embodied split axially into two individual rings 12 and 13.

The individual rings 12 and 13 of the outer bearing ring 3 each have, on the outer rim region of their lateral surfaces 14, 15, a step-shaped shoulder 16, 17 astride which a connecting element 18 is supported. In addition, all the roller bearings 1 in the exemplary embodiments have a lubrication bore 19. A radially inwardly pointing groove 20, which serves as a counterbearing for the connecting element 18, is milled into the shoulder 16 of the left-hand individual ring 12. A hook element 21 of the connecting element 18 engages in this groove 20.

In the first exemplary embodiment according to FIG. 1, the two individual rings 12, 13 are of symmetrical design with the result that a groove 22 corresponding to the groove 20 is also milled into the shoulder 17. The connecting element 18 according to FIG. 1 is embodied as a single-piece ring 23 or split ring 23 which is provided on its edges with a plurality of threaded bores 24 into which threaded bolts 25 are screwed.

The threaded bolts 25 respectively serve to form the positive-fit connection of the ring 23 to the two individual rings 12, 13 of the two-piece outer bearing ring 2, with the result that only the lower end of the threaded bolt 25, which respectively serves as a hook element 21, is significant. In this context, the width of the grooves 20 and 22 may be greater than the diameter of the threaded bolt 25, with the result that slight axial play is produced.

This axial play allows the individual rings 12 and 13 of the outer bearing ring 2 to move several millimeters to the left or to the right, which benefits the later installation of the angular contact anti-friction bearing, but nevertheless permits the individual rings 12, 13 to be effectively secured against dropping out of the angular contact anti-friction bearing during transportation. The threaded bolts 25 are respectively only loosely arranged in the grooves 20, 22. However, it is also possible to screw in at least one row of threaded bolts 25 permanently into the groove 20 or into the groove 22. Likewise, instead of the ring 23, it is possible to use a number of individual interlocks which would then be respectively screwed to one of the individual rings 12, 13.

The radial upper side of the connecting element 18 lies radially somewhat lower than the lateral surfaces 14 and 15 of the outer bearing ring 2. However, it is also possible for the upper side of the connecting element 18 to be aligned with the lateral surfaces 14 and 15. However, it is important that the connecting element 18 does not project radially beyond the lateral surfaces 14, 15 to ensure that installation of the angular contact anti-friction bearing is not made more difficult.

The two individual rings 12 and 13 of the outer bearing ring 2 do not abut against one another with their axially inner end edges but rather are at a distance from one another which is produced by the connecting element 18. In the embodiment according to FIG. 1, the connecting element 18 therefore also assumes the function of a spacer element or spacer ring.

Figure 2:
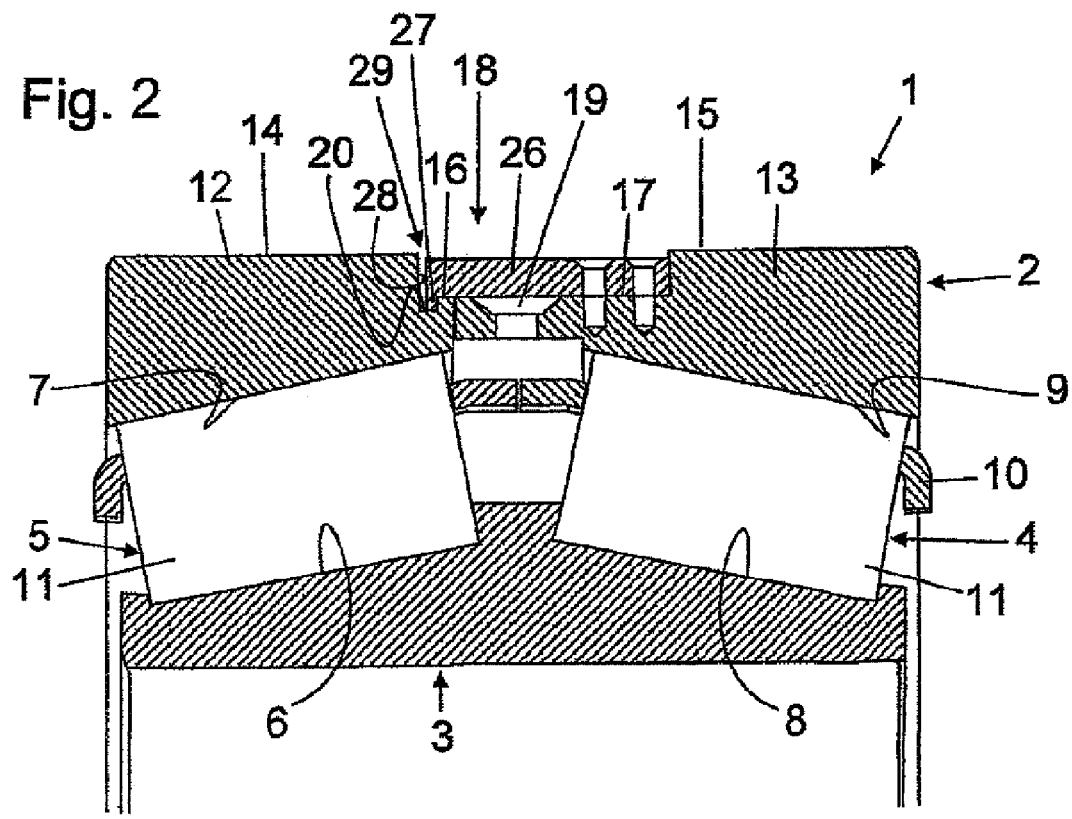
FIG. 2 shows a second exemplary embodiment of an angular contact anti-friction bearing according to the invention in cross section.

FIG. 2 illustrates a similar solution in which only the individual ring 12 is provided with the groove 20 in the shoulder 16. The connecting element 18 is composed of a plurality of interlocks 26, for example three, which are each supported on one side on the shoulder 17 of the individual ring 13 and are connected with a force fit to the individual ring by means of threaded bolts.

The other side of the interlock 26 is provided with a radially inwardly projecting rim 27 which engages in the groove 20 in the individual ring 12. A gap 29, which ensures the axial play, remains between the rim 27 and a shoulder edge 28 of the individual ring 12. In addition, the interlock 26 which is connected to the individual ring 12 only with a positive fit permits the two individual rings 12 and 13 to rotate in relation to one another. In the embodiment according to FIG. 2, it is also possible to use a ring, similar to the ring 23 from FIG. 1, instead of a plurality of individual interlocks 26.

Figure 5:
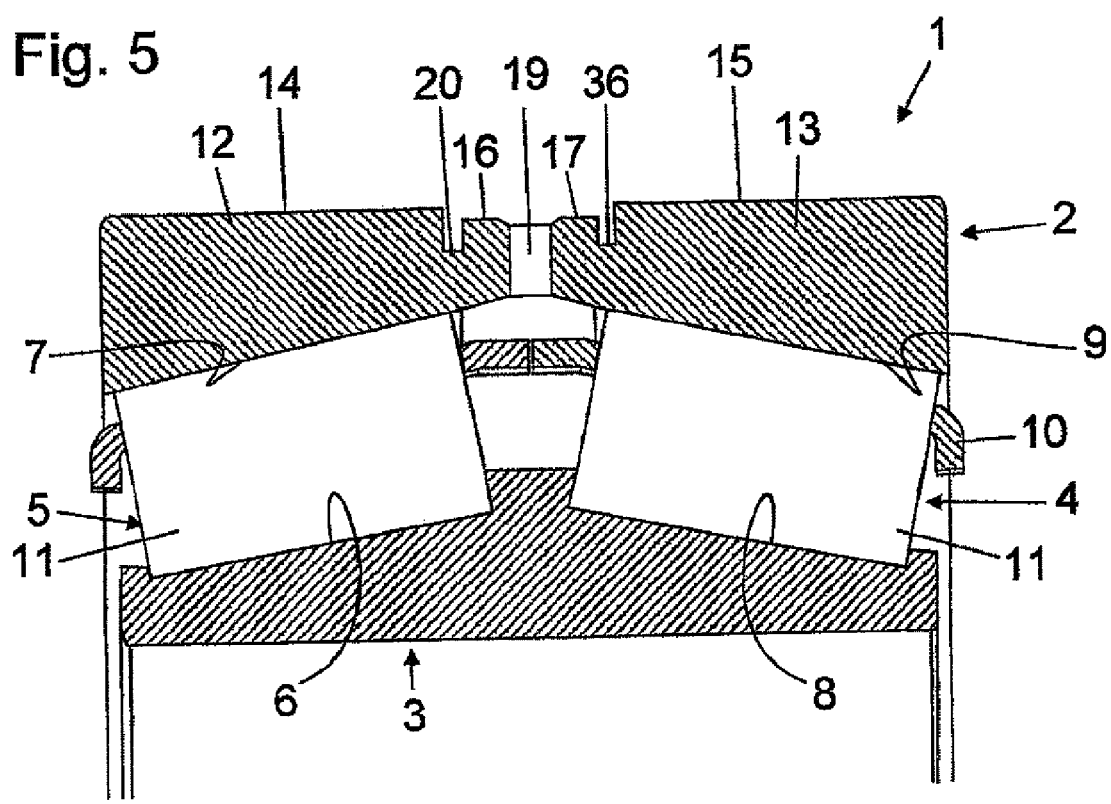
FIG. 5 shows a fifth exemplary embodiment of an angular contact anti-friction bearing according to the invention in cross section.

Three further embodiments of an angular contact anti-friction bearing according to the invention are illustrated in FIGS. 3 to 5, the connecting element 18 not being illustrated in any of said figures. In these embodiments it is possible to use a connecting element which corresponds to the ring 23 which is used in FIG. 1 and has a threaded bolt 25, or the interlock 26 which is illustrated in FIG. 2. However, it also lies within the scope of the invention to use clamping rings with a U profile with rims which are bent radially inward at the outer edges and which engage in grooves which will be described below.

In FIG. 3, the individual ring 12 has a groove 20 in which the hook element 21 of the connecting element 18 can be introduced with a positive fit. Similarly to the embodiment according to FIG. 2, the individual ring 13 is axially longer than the individual ring 12. A groove 30 is formed in the shoulder 17 in such a way that it is at the smallest possible distance from the groove 20 in the individual ring 12. A connecting element (not illustrated) which engages with hook elements in the grooves 20 and 30 is correspondingly narrow in terms of its axial width. The distance between the hook element and the groove wall 31 determines the degree of axial play of the individual rings 12 and 13 with respect to one another so that the axial play can be set by means of this distance.

FIG. 4 illustrates an embodiment of the angular contact anti-friction bearing in which a spacer ring 32 is arranged between the individual rings 12 and 13 of the outer bearing ring 2. A connecting element (not illustrated) engages with its hook elements in the groove 20 in the individual ring 12 and in a groove 33 in the shoulder 17 of the individual ring 13 and in this way connects the two individual rings 12, 13. However, it is also possible to use two connecting elements. In this context, a first connecting element engages in the groove 20 and in a groove 34 in the spacer ring 32, while a second connecting element, for example a clamping ring which is composed of steel, engages in the groove 33 in the individual ring 13 and in a groove 35 in the spacer ring 32.

FIG. 5 illustrates a fifth exemplary embodiment of an angular contact anti-friction bearing which, like the tapered roller bearing 1 from FIG. 4, has a groove 20 in the shoulder 16 of the individual ring 12, with the two individual rings 12 and 13 being of symmetrical design so that the individual ring 13 also has a shoulder 17 with a groove 36. A hook element of a connecting element (not illustrated here) respectively engages in the grooves 20 and 36, as a result of which the two individual rings 12 and 13 are connected to one another and secured. The groove 20 is made somewhat wider here than the groove 36, permitting slight axial play between the individual rings 12, 13 and enabling them to rotate in relation to one another.

All that remains to be mentioned is that the described embodiments of the angular contact anti-friction bearing according to the invention are only exemplary and that the embodiment according to the invention can analogously also be implemented on double-row tapered roller bearings in an O arrangement or else on bearing units composed of two or more bearings of any possible design.

| List of reference numerals | |
| --- | --- |
| 1 | Tapered roller bearing |
| 2 | Outer bearing ring |
| 3 | Inner bearing ring |
| 4 | Row |
| 5 | Row |
| 6 | Raceway |
| 7 | Raceway |
| 8 | Raceway |
| 9 | Raceway |
| 10 | Bearing cage |
| 11 | Roller body |
| 12 | Individual ring |
| 13 | Individual ring |
| 14 | Lateral surface |
| 15 | Lateral surface |
| 16 | Shoulder |
| 17 | Shoulder |
| 18 | Connecting element |
| 19 | Lubrication bore |
| 20 | Groove |
| 21 | Hook element |
| 22 | Groove |
| 23 | Ring |

| List of reference numerals | |
|---|---|
| 24 | Threaded bore |
| 25 | Threaded bolt |
| 26 | Interlock |
| 27 | Rim |
| 28 | Shoulder edge |
| 29 | Gap |
| 30 | Groove |
| 31 | Groove wall |
| 32 | Spacer ring |
| 33 | Groove |
| 34 | Groove |
| 35 | Groove |
| 36 | Groove |

The invention claimed is:

1. A double-row angular contact anti-friction bearing, comprising:
a split outer bearing ring;
a one-piece inner bearing ring; and
a plurality of roller bodies which roll between the bearing rings in two rows, one next to the other, on raceways and are held at uniform distances from one another by means of a bearing cage; and
wherein the outer bearing ring is of axially split design and is composed of two individual rings which are connected to one another by means of a connecting element,
wherein the individual rings of the outer bearing ring are connected to one another with a positive fit and with play by means of the connecting element,
wherein lateral surfaces of the individual rings each have at least one shoulder astride which the connecting element is supported,
wherein at least the shoulder of one of the individual rings has a groove in which a hook element of the connecting element engages with a positive fit, and
wherein the individual rings can be rotated in relation to one another,
wherein the connecting element has a plurality of threaded bores at edges of the connecting element with threaded bolts screwed into the threaded bores and
wherein the threaded bolts are connected at least to an individual ring with a positive fit.

2. The angular contact anti-friction bearing as claimed in claim 1, wherein the connecting element is connected with a force fit to one individual ring and with a positive fit to the respective other individual ring.

3. The angular contact anti-friction bearing as claimed in claim 1, wherein the hook element has a diameter and the groove has a width and the width of the groove is greater than the diameter of the hook element.

4. The angular contact anti-friction bearing as claimed in claim 1, wherein the radial upper side of the connecting element is arranged radially lower than the lateral surfaces of the individual rings.

5. The angular contact anti-friction bearing as claimed in claim 1, wherein the radial upper side of the connecting element is aligned with the lateral surfaces of the individual rings.

6. The angular contact anti-friction bearing as claimed in claim 1, wherein the connecting element is embodied as a one-piece ring or as a split ring.

7. The angular contact anti-friction bearing as claimed in claim 1, wherein the connecting element is composed of a plurality of interlocks which are each connected with a positive fit to the individual rings.

8. The angular contact anti-friction bearing as claimed in claim 1, wherein the connecting element is embodied as a clamping strip with a U profile.

9. The angular contact anti-friction bearing as claimed in claim 1, wherein the hook element is embodied as a radially inwardly projecting rim or as a threaded bolt.

10. The angular contact anti-friction bearing as claimed in claim 1, wherein the connecting element is embodied as a spacer element in such a way that an axial distance is produced between the individual rings by means of the connecting element which is connected to the individual rings with a positive fit.

11. The angular contact anti-friction bearing as claimed in claim 1, wherein the two individual rings are of symmetrical such that that the shoulder of the one of the individual rings which has the groove corresponds to the shoulder of another of the individual rings which has an additional groove and the additional groove is milled into the another of the individual rings.

12. The angular contact anti-friction bearing as claimed in claim 11, wherein the groove in one of the individual rings is axially wider than the additional groove in the another of the individual rings.

13. The angular contact anti-friction bearing as claimed in claim 1, wherein a spacer ring is arranged between the individual rings of the outer bearing ring.

14. The angular contact anti-friction bearing as claimed in claim 1, wherein the angular contact anti-friction bearing is embodied as a tapered roller bearing and is used as a fixed bearing for a main bearing of a rotor of a wind power installation.

* * * * *